United States Patent
Kopetz

(10) Patent No.: US 11,481,012 B2
(45) Date of Patent: Oct. 25, 2022

(54) MAINTAINABLE DISTRIBUTED FAIL-SAFE REAL-TIME COMPUTER SYSTEM

(71) Applicant: TTTech Computertechnik AG, Vienna (AT)

(72) Inventor: Hermann Kopetz, Baden (AT)

(73) Assignee: TTTECH COMPUTERTECHNIK AG, Vienna (AT)

(*) Notice: Subject to any disclaimer, the term of this patent is extended or adjusted under 35 U.S.C. 154(b) by 287 days.

(21) Appl. No.: 16/887,513

(22) Filed: May 29, 2020

(65) Prior Publication Data

US 2020/0393888 A1 Dec. 17, 2020

(30) Foreign Application Priority Data

Jun. 11, 2019 (EP) .................................... 19179481

(51) Int. Cl.
*G06F 11/30* (2006.01)
*G06F 1/3206* (2019.01)
(Continued)

(52) U.S. Cl.
CPC ........ *G06F 1/3206* (2013.01); *G06F 11/3003* (2013.01); *G06F 11/3055* (2013.01);
(Continued)

(58) Field of Classification Search
CPC ............. G06F 11/3003; G06F 11/3006; G06F 11/3055; G06F 11/2038; G06F 11/2023;
(Continued)

(56) References Cited

U.S. PATENT DOCUMENTS

| 4,596,012 A | * | 6/1986 | Reed | ..................... G06F 13/372 370/503 |
| 2010/0070558 A1 | * | 3/2010 | Miura | ................. G06F 11/0709 709/202 |

(Continued)

OTHER PUBLICATIONS

Search Report for European U.S. Appl. No. 19/179,481, dated Dec. 9, 2019 (12 pages).

(Continued)

*Primary Examiner* — Yolanda L Wilson
(74) *Attorney, Agent, or Firm* — Eversheds Sutherland (US) LLP

(57) ABSTRACT

A distributed maintainable real-time computer system is provided, wherein the real-time computer system includes at least two central computers and one, two or a plurality of peripheral computers. The central computers have access to a sparse global time, have identical hardware and identical software, but different startup data, wherein each functional central computer periodically sends time-triggered multi-cast life-sign messages to the other central computers according to a time plan a priori defined in its startup data, and wherein the peripheral computers (151, 152, 153, 154) can exchange messages (135) with the central computers (110, 120), and wherein at all times one central computer is in the active state and the other central computers are in the non-active state, and wherein after the apparent absence of a life-sign message of the active central computer expected at a planned reception time, that non-active functioning central computer which has the shortest start-up timeout takes over the function of the active central computer, and wherein each central computer (110, 120; 200) consists of three independent subsystems, an application computer (210), a storage medium having the startup data (230) characteristic of the central computer (200) and an internal monitor (220), wherein the internal monitor (220) periodi- (Continued)

cally checks the correct functioning of the application computer (210), and wherein upon detection of an error the monitor (220) initiates a hardware reset and a restart of the application computer (210), and wherein preferably the active central computer initiates a maintenance action after an apparent absence of the life-sign messages expected at the planned reception times from a non-active central computer, which action can lead to the repair or replacement of a permanently failed central computer.

17 Claims, 1 Drawing Sheet

(51) Int. Cl.
*H02J 50/00* (2016.01)
*G06F 21/50* (2013.01)
*H04L 9/30* (2006.01)

(52) U.S. Cl.
CPC .............. *G06F 21/50* (2013.01); *H02J 50/00* (2016.02); *H04L 9/30* (2013.01); *G06F 2221/2103* (2013.01)

(58) Field of Classification Search
CPC .. G06F 11/0709; G06F 11/2041; H04L 43/10; G05B 23/0259; G05B 23/0262
See application file for complete search history.

(56) References Cited

U.S. PATENT DOCUMENTS

| | | | |
|---|---|---|---|
| 2014/0164851 A1* | 6/2014 | Pelly | G06F 11/0751 714/48 |
| 2016/0050563 A1* | 2/2016 | Bronk | H04W 12/06 726/7 |
| 2017/0048339 A1* | 2/2017 | Straub | H04L 67/22 |
| 2017/0192417 A1* | 7/2017 | Kopetz | G05B 23/0294 |
| 2018/0007144 A1* | 1/2018 | Griffiths | H04L 67/141 |
| 2018/0088561 A1* | 3/2018 | Ohno | G06F 11/0709 |

OTHER PUBLICATIONS

Kopetz, Hermann, "Real-Time Systems: Design Principles for Distributed Embedded Applications" in The Kluwer International Series in Engineering and Computer Science; Real-Time Systems, Consulting Editor, J.A. Stankovic, Kluwer Academic Publishers 2002, Print ISBN: 0-792-39894-7.

* cited by examiner

MAINTAINABLE DISTRIBUTED FAIL-SAFE REAL-TIME COMPUTER SYSTEM

CROSS REFERENCE TO RELATED APPLICATIONS

This application claim priority to European Application No. 19179481.7, filed Jun. 11, 2019, which is incorporated by reference herein.

FIELD OF THE INVENTION

The invention relates to a distributed maintainable real-time computer system, for example for controlling and/or monitoring an installation, wherein the real-time computer system comprises at least two central computers and one, two or a plurality of, in particular a variety of peripheral computers, wherein the installation is controlled and/or monitored, for example with the one, two or the plurality of peripheral computers, wherein in particular each peripheral computer controls and/or monitors a part of the installation.

The present invention falls within the field of computer technique.

BACKGROUND OF THE INVENTION

In the field of Ambient Intelligence, computer systems are installed in many buildings to perform important tasks. For example, in a house having a solar installation and a battery storage, energy management—when to charge and discharge the battery or when to draw energy from the network or deliver it to the network—is performed by a distributed real-time computer system.

These real-time computer systems must be fail-safe and should require minimal maintenance.

It is an object of the present invention to specify a hardware/software architecture which ensures the fail-safe and maintainability of such a distributed real-time computer system.

DESCRIPTION OF THE INVENTION

This object is solved with a real-time computer system mentioned above in that, according to the invention, the central computers have access to a sparse global time and the central computers have identical hardware and identical software, but use different startup data, wherein each functional central computer periodically sends time-triggered multi-cast life-sign messages to the other central computers according to a time plan defined a priori in its startup data, wherein the peripheral computers can exchange messages with the central computers, and wherein at any given time one central computer is in the active state and the other central computers are in the non-active state, and wherein, in particular immediately after the apparent absence of a life-sign message of the active central computer expected at a planned reception time, that non-active functioning central computer which has a shortest start-up timeout of all non-active functioning central computers takes over the function of the active central computer, and wherein each central computer consists of three independent subsystems, an application computer, a storage medium having the startup data characteristic of the central computer and an internal monitor, wherein the internal monitor periodically checks the correct functioning of the application computer, and wherein upon detection of an error the monitor initiates a hardware reset and a restart of the application computer, and wherein preferably the active central computer initiates a maintenance action after an apparent absence of the life-sign messages expected at the planned reception times from a non-active central computer, which can lead to the repair or replacement of a permanently failed central computer.

Advantageous embodiments of the real-time computer system according to the invention, which can be realized alone or in combination, are described in the following:

- The central computers may have a fail-silent characteristic.
- The application computer of a central computer can periodically send a life-sign to the monitor of the central computer.
- The monitor of the central computer can periodically run a challenge-response protocol to check the functionality of the application computer of the central computer.
- The active central computer can send a start state message of a time-limited state message sequence to the peripheral computers after a significant event occurs.
- A peripheral computer may have sensors to monitor the physical state of an environment.
- The identical software for all central computers can be cryptographically secured using a public key method.
- It can be derived from a value of an indicator, which of the different startup data sets contained in the software of a central computer is used in this central computer.
- The time-triggered life-sign messages of a host computer may include the value of the indicator that identifies the startup data set currently in use on that host computer.
- From a newly added central computer, after loading its software having different startup data sets, the newly added central computer may receive the life-sign messages of all functioning central computers and derive from these life-sign messages which startup data sets are already in use, and the newly added central computer may set its indicator in such a manner that the first currently unused startup data set is used in the newly added central computer.
- After the apparent absence of the state messages expected at the planned reception times from a non-active central computer, the active central computer may order a replacement or replacement parts for the failed central computer, preferably via the Internet.
- The central computers may have independent energy supplies, preferably equipped with a battery.
- The central computers can be supplied with energy via a wireless charging station.
- A central computer may have redundant wired or wireless communication channels, preferably based on different transmission technologies, for communication with the other central computers and/or the peripheral computers.
- The central computer may have an Internet connection through which human-machine communication with users can be conducted e.g. using mobile devices such as a smart phone or tablet.
- The application computer of a central computer can provide a platform for processing a variety of application programs (apps) for controlling the process peripherals.
- In a safety-relevant application, the peripheral computers and the corresponding installation parts can be designed redundantly.

According to the invention, a maintainable fail-safe computer system according to the invention comprises two or a plurality of central computers and one, two or a plurality of peripheral computers, in particular a variety of peripheral computers which e.g. perform the control of a process periphery. It is assumed that the central computers have access to a global sparse global time with known granularity [Kop11].

Of the at least two central computers that have identical hardware, one central computer is in the active state and the other central computers are in the inactive state at all times.

An inactive central computer can either be in a functional state or in a failed state.

A failed inactive central computer is either in a transient failed state or in a permanent failed state.

From the point of view of maintainability, the distinction between transient failed and permanent failed is substantial. In a transient failed central computer the data structures are corrupted, but the computer hardware is functioning. A transient failed central computer can be reset and restarted to an inactive functional state. Experience shows that the majority of error causes are transient. An example for such a transient error cause is a Single Event Upset (SEU, see [WikSE]).

A permanent failed computer has a defective hardware and must be replaced.

The active central computer controls a given installation and sends multicast state messages, which describe the desired future state of the installation, to the peripheral computers. A message sent in the multicast method is transmitted to a plurality of recipients simultaneously, but none of the recipients acknowledges the message.

The term installation comprises all technical devices to be controlled and monitored by the central computer, e.g. a photovoltaic installation, or an intrusion reporting installation. For example, each functionally completed installation part is controlled by a peripheral computer equipped with the necessary process peripherals.

A state message contains state data, which are statements about the state of a system. The opposite are event messages, which inform about a state change. The advantage of state messages is their idempotency, i.e. receiving an identical state message a plurality of times has the same effect as receiving this state message once. This advantage is important after the occurrence of an error, because sending a state message repeatedly has the same effect as sending the state message once.

A state message is time-triggered if the time of sending a state message is derived from the progression of time according to an a priori created time plan.

The peripheral computers respond with state messages describing the current state of the process peripherals and the installation and send these state messages in multicast method to all functioning central computers.

Each functioning central computer receives all state messages sent in multicast method from all other functioning central computers and from the peripheral computers and updates its internal state. This ensures that all central computers always have the same internal state.

The internal state of a central computer is a data structure containing the current values of the relevant state variables of the installation and the distributed computer system. For example, the state of the entrance door of a house—locked or unlocked—is represented in a state variable with the values 1 or 0.

The at least two central computers have identical hardware and identical software, but different startup data. The startup data contain the different time plans—e.g. when a central computer has to send or receive a time-triggered message—and a start-up timeout characterizing the central computer. The start-up timeout specifies the time interval how long a central computer has to wait at least after power-up before it is allowed to send a first life-sign message. Each central computer has a different start-up timeout.

A central computer contains two independent subsystems, an application computer and an internal monitor. The internal monitor periodically checks the correct functioning of the application computer. In case the monitor detects a faulty behavior of the application computer, the application computer is switched off by the monitor. The monitor then initiates a reset and restart of the application computer.

If, at the planned reception times included in the startup data, the expected life-sign messages from the active central computer are apparently absent, the non-active functional central computer having the shortest start-up timeout takes over the function of the active central computer. The new active central computer sends this state change to all other central computers in its next life-sign message.

The exact meaning of the term apparently absent depends on the specific environmental conditions of the existing overall system and is to be defined during the commissioning of a system. In an interference-free environment, the active central computer is considered to be apparently failed as soon as an expected life-sign message from the active central computer is not received by the other central computers. If the environment is susceptible to interference, the failure of one or a plurality of life-sign messages can be tolerated before the active central computer is classified as apparently failed.

If the expected time-triggered life-sign message (or expected life-sign messages) of an inactive central computer is apparently absent, the active central computer first assumes that the failure is transient. If the central computer still remains failed after an a priori defined restart timeout, the active central computer assumes a permanent failure. In this case the active central computer can request a replacement part, e.g. via the Internet.

The exact meaning of the term apparently depends on the specific environmental conditions and on the time interval required—the restart timeout—to realize the restart of a central computer. Only after the restart timeout, during which multiple restart attempts were unsuccessful, a permanent failure is assumed. This restart timeout is intended to prevent a transient error cause in a central computer from leading to a (unnecessary) replacement of the hardware of the central computer.

In the following the invention is explained in detail by the example shown in the drawings. In which:

FIG. 1 shows an example of a maintainable computer system having two central computers 110, 120 and four peripheral computers 151, 152, 153, 154.

Figure 1:
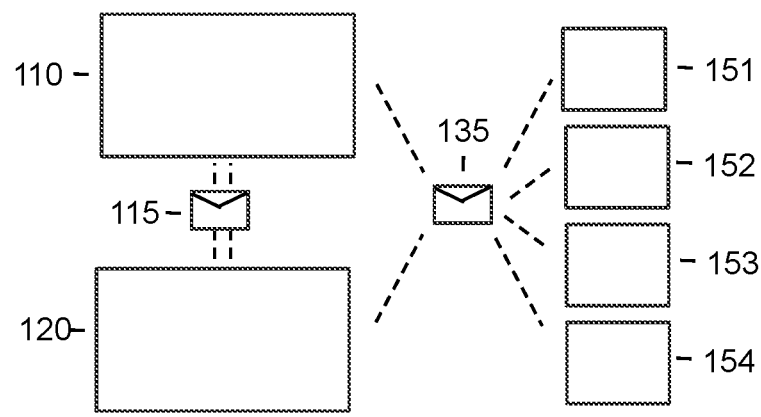
FIG. 1 shows two central computers and four peripheral computers.

The two central computers 110, 120 exchange periodic time-triggered state messages via a communication channel 115. These state messages also have the function of life-sign messages.

The message exchange can occur via a wired or wireless communication channel (e.g. via Wi-Fi or Bluetooth). It is advantageous if the communication channel 115 is designed redundantly and the redundant communication channels are based on different data transmission technologies, in such a manner that an error in one of the two redundant communication channels can be detected and masked.

The communication between the central computers 110, 120 and the peripheral computers 151, 152, 153, 154 is preferably performed via a time-limited state message sequence.

This message exchange or communication can occur via a wired or wireless communication channel 135 (e.g. via Wi-Fi or Bluetooth). It is advantageous if a communication channel 135 provided for this purpose is designed redundantly and the redundant communication channels are based on different data transmission technologies, in such a manner that an error in one of the two redundant communication channels can be detected and masked.

A time-limited state message sequence is a sequence of state messages that is started by the active central computer, e.g., the central computer 110, upon detection of a significant event by sending a start state message to the peripheral computers and that is terminated after the last expected response state messages from the peripheral computers have arrived.

A significant event is either the occurrence of an a priori predetermined time event (i.e. a predetermined time is reached) or a state change in the installation observed by the active central computer or a request by a user to make a state change in the installation.

A data field of the start state message contains an intended future state of the process periphery and the connected installation part of one or a plurality of peripheral computers.

The addressed peripheral computers perform the intended state change and respond with one or a plurality of multi-cast response state messages, which contain the current state of the process periphery and the installation. These multi-cast response state messages are received by all functioning central computers. Preferably, in order to ensure that the intended effect has actually occurred in the physical environment of the peripheral computer, the peripheral computer has sensors (e.g. a camera) with which the intended effect (or its absence) can be observed in the physical environment of the peripheral computer (e.g. opening state of a window).

If the expected response state messages do not arrive at the active central computer within an a priori predetermined response timeout, the active central computer can repeat the state message sequence several times. If the several repetitions are unsuccessful, or if an error is observed in the physical effect, the active central computer detects an error in the peripheral computer or in the installation and issues a corresponding error notice to the user. Since state messages are idempotent, repeating identical state messages has no impact on the state.

Figure 2:
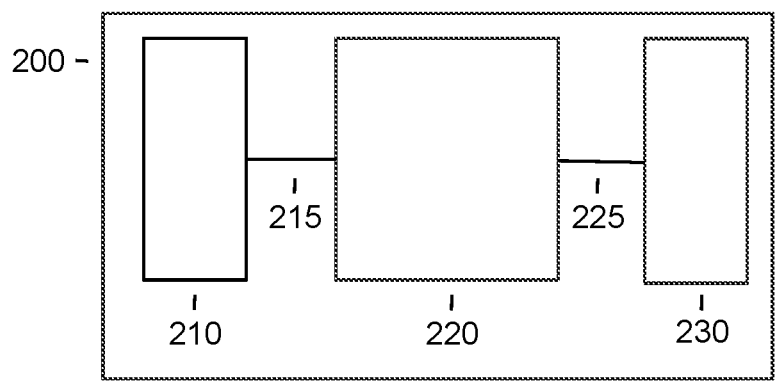
FIG. 2 shows the internal design of a central computer.

FIG. 2 shows the internal design of a central computer. The central computer 200 consists of a monitor 210, an application computer 220, and an exchangeable storage medium for startup data 230.

The software for the central computer can be loaded from a USB storage or from a cloud via the Internet.

It is advantageous if the software is cryptographically secured by means of a public key method. The central computer 200 is then able to check the integrity of the software by means of a known public key before restarting the software. The corresponding private key for creating the software is preferably only known to the authorized creator of the software.

The startup data 230 can be loaded e.g. from an exchangeable USB storage.

There is also the possibility that different startup data sets for all central computers are included in the software for the central computers and it depends on the value of an indicator which set of startup data is to be used in the central computer 200.

An indicator is a hint that indicates which alternative has to be selected from a given amount of alternatives—the different startup data sets.

The current value of the indicator is included in every life-sign message of a functioning central computer.

One possibility is to derive the value of the indicator from the location of a mechanical switch on the respective central computer 200.

Another possibility is to derive the value of the indicator from a contact strip of a charging station for the respective central computer 200.

A charging station is a device, advantageously with a battery, which realizes the energy supply of the central computer. In the concrete example, the two charging stations for the central computers 110, 120 have different contact strips.

A further possibility is to set the value of the indicator in the cold start phase of the distributed computer system (immediately after power up of the whole system) by an algorithm using random numbers.

After loading the software with all different startup data sets (e.g. from the cloud or a USB storage), a newly added central computer will first receive the life-sign messages from all functioning central computers. From the life-sign messages it can be derived which startup data sets are already in use. The indicator is now set in the newly added central computer in such a manner that the first currently unused startup data set is used by the newly added central computer.

Each functioning central computer periodically sends time-triggered state messages to the other central computers in multicast method—according to the selected a priori created time plan, which is preferably part of the startup data. Such a state message is interpreted as a life-sign message from the corresponding sending central computer. Time-triggered life-sign messages enable a very short error detection latency.

If the functioning inactive central computer having the shortest start-up timeout has not received a life-sign message from the active central computer immediately after the specified reception time (which is included in the startup data), it assumes the role of the active central computer and sends a multicast life-sign message with the remark active central computer to all other central computers. All other central computers go into the inactive state after power-up, after receiving this active central computer message.

The internal monitor 210 periodically checks the correct functioning of the application computer 220. This check can be performed either by the reception of a periodic life-sign of the application computer 220 by the monitor 210 or by the periodic initiation of a challenge-response protocol by the monitor 210.

A life-sign is a periodic signal that is sent from the application computer 220, for example via a data line 215, to the monitor 210. If the life-sign is absent, the monitor assumes that the application computer 220 is failed and initiates a reset and a restart of the application computer 220.

Challenge-response protocols for authenticating the correct behavior of a computer are described in detail in the specialized literature [WikCR]. The monitor 210 periodically sends a challenge message with a variable start value of a task to the application computer 220 e.g. via the data line 215. The application computer 220 has to respond to the task with the correct answer within a predetermined time interval. In case the monitor detects a faulty behavior of the application computer, the monitor 210 initiates a reset and a restart of the application computer 220.

It is advantageous if the central computer 200 has fail-silent characteristics, i.e. only produces correct or recognizably wrong output messages. A recognizably wrong output message is rejected by the recipient. The state of art teaches how to build a computer having fail-silent characteristic (see [Kop11, p.130]).

A standard operating system, e.g. LINUX, or a proprietary operating system can be used in the application computer 220. The application computer 220 has a wired or wireless communication channel (e.g. via Wi-Fi) to the Internet and on to a cloud for processing the collected data. The software for the central computer can also be loaded via this communication channel and replacement parts for defective components can be ordered. The human-machine interface of the distributed computer system can also be handled by means of an app (application software) via the Internet with a smart phone or tablet of the user.

The application computer 220 provides a platform for executing a variety of application programs (apps) for controlling the process peripherals. These application programs are developed e.g. in coordination with or by the supplier of the existing peripheral computers and process peripherals.

It is advantageous if the energy supplies of the central computers 110, 120 are independent of each other. For example, the central computers may each have a battery to buffer the energy supply.

It is advantageous if the energy supply of the central computers 110, 120 is effected via wireless charging stations.

It is advantageous if the entire data transfer is handled via wireless communication channels and the software is loaded from the cloud.

It is advantageous if in a safety-relevant application—e.g. in the field of medical technology—the peripheral computers and the corresponding installation parts are also designed redundantly.

Troubleshooting an error of a permanently failed central computer can be done as follows:
1. After a permanently failed central computer is detected by the active central computer, a new central computer is automatically ordered by the active central computer via the Internet.
2. Unwrapping of the arrived package and positioning at the designated location of the charging station.
3. Automated loading of software from the cloud, automatic selection of startup data, and automatic restart of the new central computer to the state of inactive functional central computer.

The only manual action for troubleshooting is to unwrap the arrived package and position the new central computer in the designated location of the existing charging station.

Such simple troubleshooting does not require specially trained maintenance personnel, which leads to considerable cost savings.

Since a central computer is still functioning, continuous operation during maintenance is ensured.

An error in a peripheral computer and the connected installation is detected and diagnosed by the active central computer. If redundant peripheral computers and redundant installation parts are present in a safety-critical application, a failure of a peripheral computer or an installation part can be tolerated without interrupting the operation of the safety-critical application.

In view of the currently high maintenance costs for electronic systems, the invention disclosed here is of great economic importance.

LITERATURE CITED

[Kop11] Kopetz, H., *Real-Time Systems*. Springer Verlag. 2011
[WikCR] Wikipedia: *Challenge-Response Authentication*. Accessed on May 21, 2019
[WikSE]) Wikipedia: *Single Event Upset*. Accessed on May 21, 2019

That which is claimed is:

1. A distributed maintainable real-time computer system for controlling and/or monitoring an installation, the real-time computer system comprising:
    at least two central computers (110, 120; 200); and
    one or more peripheral computers (151, 152, 153, 154),
        wherein the installation is controlled and/or monitored with the one or more peripheral computers, wherein each peripheral computer controls and/or monitors a part of the installation,
    wherein the central computers have access to a sparse global time and the central computers have identical hardware and identical software, but use different startup data, wherein each functional central computer periodically sends time-triggered multi-cast life-sign messages to the other central computers according to a predetermined time plan defined a priori in its startup data, wherein the peripheral computers (151, 152, 153, 154) can exchange messages (135) with the central computers (110, 120), and wherein at any given time one central computer is in the active state and the other central computers are in the non-active state, and wherein, in particular immediately after the apparent absence of a life-sign message of the active central computer expected at a planned reception time, that non-active functioning central computer which has the shortest start-up timeout of all non-active functioning central computers takes over the function of the active central computer, and wherein each central computer (110, 120; 200) consists of three independent subsystems, an application computer (210), a storage medium having the startup data (230) characteristic of the central computer (200) and an internal monitor (220), wherein the internal monitor (220) periodically checks the correct functioning of the application computer (210), and wherein upon detection of an error, the internal monitor (220) initiates a hardware reset and a restart of the application computer (210),
    wherein the active central computer sends a start state message of a time-limited state message sequence to the peripheral computers after an occurrence of a significant event.

2. The real-time computer system according to claim 1, wherein the central computers (110, 120; 200) have a fail-silent characteristic.

3. The real-time computer system according to claim 1, wherein the application computer (210) of a central computer (200) periodically sends a life-sign message to the internal monitor (220) of the central computer (200).

4. The real-time computer system according to claim 1, wherein the internal monitor (220) of the central computer (200) periodically executes a challenge-response protocol to check the functional capability of the application computer (210) of the central computer (200).

5. The real-time computer system according to claim 1, wherein a peripheral computer has sensors to observe a physical state of an environment.

6. The real-time computer system according to claim 1, wherein the identical software for all central computers (110, 120) is cryptographically secured by means of a public key method.

7. The real-time computer system according to claim 1, wherein a value derived from an indicator determines which of the different startup data sets contained in the software of a central computer is used in this central computer.

8. The real-time computer system according to claim 1, wherein the time-triggered life-sign messages of a central computer contain the value of the indicator characterizing the startup data set currently used in that central computer.

9. The real-time computer system according to claim 1, wherein from a newly added central computer, after loading its software having different startup data sets, the life-sign messages of all functioning central computers are received and from these life-sign messages it is derived which startup data sets are already in use, and the newly added central computer sets its indicator in such a manner that the first startup data set not used at the present time is used in the newly added central computer.

10. The real-time computer system according to claim 1, wherein after the apparent absence of the state messages from a non-active central computer expected at the planned reception times, the active central computer orders a replacement or replacement parts for the failed central computer via the Internet.

11. The real-time computer system according to claim 1, wherein the central computers are equipped with a battery or other independent energy supply.

12. The real-time computer system according to claim 1, wherein the central computers are supplied with energy via a wireless charging station.

13. The real-time computer system according to claim 1, wherein a central computer has redundant wired or wireless communication channels for communication with the other central computers and/or the peripheral computers.

14. The real-time computer system according to claim 13, wherein the redundant wired or wireless communication channels are based on different transmission technologies.

15. The real-time computer system according to claim 1, wherein the central computer has an Internet connection via which human-machine communication with users can be conducted.

16. The real-time computer system of claim 15, wherein the human-machine communication with users can be conducted using a smart phone, tablet, or other mobile device.

17. The real-time computer system according to claim 1, wherein the active central computer initiates a maintenance action after an apparent absence of the life-sign messages expected at the planned reception times from a non-active central computer, which can lead to the repair or replacement of a permanently failed central computer.

* * * * *